Feb. 5, 1924.

T. A. JENKINS

GLASS VENTILATOR

Filed March 17, 1922

1,482,996

INVENTOR
THOMAS A. JENKINS
BY
Geo. P. Kimmel
ATTORNEY

Patented Feb. 5, 1924.

1,482,996

UNITED STATES PATENT OFFICE.

THOMAS A. JENKINS, OF JERSEY CITY, NEW JERSEY.

GLASS VENTILATOR.

Application filed March 17, 1922. Serial No. 544,541.

*To all whom it may concern:*

Be it known that I, THOMAS A. JENKINS, a citizen of the United States, residing at Jersey City, in the county of Hudson and State of New Jersey, have invented certain new and useful Improvements in Glass Ventilators, of which the following is a specification.

This invention relates to ventilators generally, and more particularly to a type of the same adapted for use in the ventilating of buildings of all descriptions, railway cars, tube or therminal cars, automobiles, vehicles, air craft of all descriptions, ships of all descriptions, and in any other place where it is desirable, necessary or possible to ventilate.

The basic object of this invention is the use of glass in any and all of its forms, and the dominating materialistic factor thereof is for the purpose of affording light to the interior of buildings, cars, vehicles, air craft or ships to be ventilated, and in the case of translucent, or opaque glass ventilators being used to afford the lighting of such interiors, in addition to the ventilation thereof, without the necessity of providing shades, or other similar means to prevent the interior from being open to view from the outside thereof.

A further object of the invention is to provide for the manufacture of ventilator elements from glass in all its forms, such as, transparent, translucent, opaque or otherwise, also milk glass, frosted glass, ground glass, colored glass wired glass or the like.

A further object of the invention is to provide for ventilators of the class set forth, and which may be in the form of windows, doors, partitions, panels, sky-lights and the like.

Another and equally important object of the invention is to provide for ventilators of the type mentioned, and one of a construction and arrangement such as readily adapts the same for substitution as the day lighting medium of the interior of a room, compartment or the like, and in a manner to be rain proof when in position and which, when made from opaque glass, dispenses with the use of shades and curtains whereby to give the desired privacy to the interior.

With the foregoing and other objects in view, the invention resides in the certain new and useful construction and arrangement as will be hereinafter more fully described, set forth in the appended claims, and illustrated in the accompanying drawings, in which:—

Figures 1, 2:
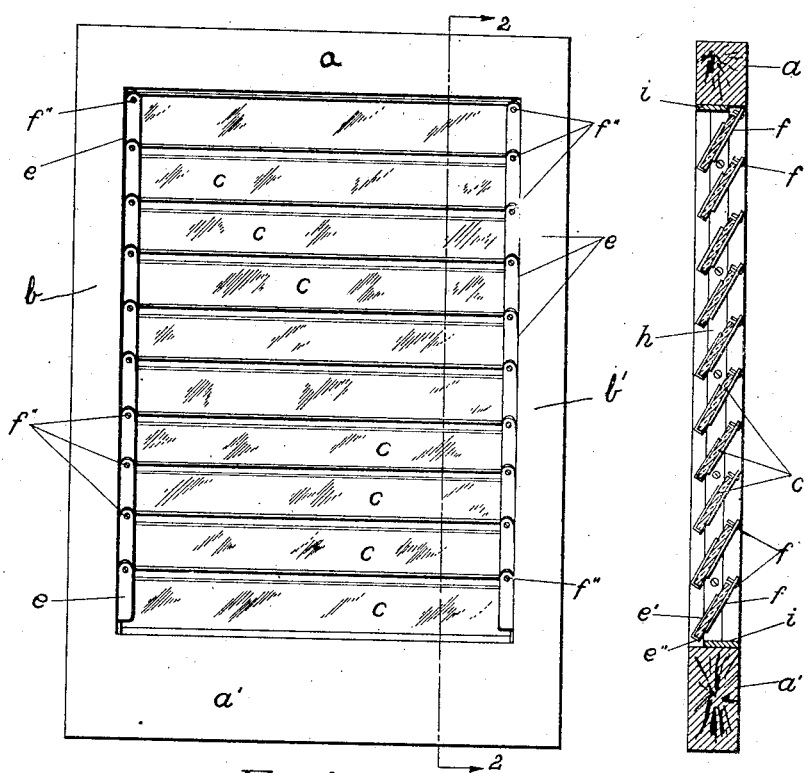
Figures 3, 4, 5:
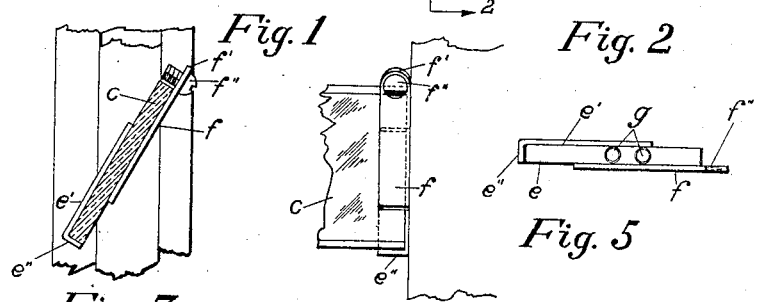
Figures 6, 7:
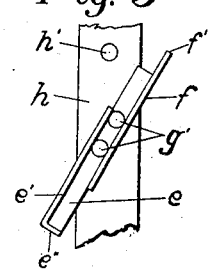

Figure 1 is a front elevation of a preferred embodiment of the ventilator as constructed and arranged in accordance with the present invention, Fig. 2 is a vertical section taken on the line 2—2 of Fig. 1, Fig. 3 is an enlarged detail, in front elevation, showing the manner of mounting a ventilator plate or slat in position, Fig. 4 is a similar detail view thereof, but in side elevation, Fig. 5 is a plan view of the outer face of one of the plate or slat end supporting members as employed in the modified manner of mounting of the plates or slats, Fig. 6 is a plan view of the inner face of a plate or slat supporting member, and, Fig. 7 is a fragmentary elevation showing a slightly modified manner of mounting the ventilator plates or slats in position.

Referring to the drawing, and more particularly to Figs. 1 and 2 thereof, $a$, $a'$ indicates the upper and lower horizontal bars or members, $b$, $b'$, the oppositely disposed vertical side members or bars of a ventilator plate, and $c$ a plurality of ventilator plates or slats arranged transverely of the opening of the frame, one in spaced, inclined and overlapping relation with respect to the other, whereby to provide upwardly and inwardly directed passage ways for the free flow of air therethrough, the overlapping relation of the several plates or slats, however, acting to prevent the entrance of rain or snow into the passage ways therebetween when the ventilator is employed in bad weather.

In Figs. 3 to 6, inclusive, I have shown the use of supporting members for the opposite ends of the ventilator plates or slats $c$. Each of the supporting members comprises a strip of metal $e$ of a length approximating the width of the plates or slats $c$, and are formed with oppositely disposed end portions $e'$ and $f$, each having one end thereof disposed inwardly of the opposite ends of the strips $e$, so that the inner end portions of the flanges are disposed in overlapping relation for equal distances to either side of the transverse center of the strip $e$. The lower end of the flange portion $e'$ is inwardly bent at right angles to provide an extension $e''$ to support thereon the lower edge of a ventilator plate or slat c, when the same is inserted downwardly between the flanges e' and f. The upper end of the flange f is formed to provide a straight extended portion f', projecting for a slight distance above the upper edge of the strip e, and consequently above the upper edge of the top edge of a ventilator plate or slat c supported in position between the flanges e' and f, and this portion f' is apertured to receive a screw f'' arranged to engage over the upper edge of the ventilator plate or slat, substantially as is shown. The strip e may be provided with a pair of openings g spaced to either side of the transverse center thereof for the reception of fastening screws, whereby it may be positively secured in position to the frame if desired, in lieu of being merely retained in position by means of the opposed edges of the spacer plate d.

Referring now to Fig. 7, I have shown therein a manner of mounting the supporting member e is position, and without the use of the spacer plate d, and in this instance, I make use of metal strips h, which are provided with apertures h' for the reception of screws or the like for the securing of the same along the inner faces of the vertical bars or members b, b' of the frame, and against the outer faces of the strip h, are secured, by means of screws g', the supporting members e and in their properly inclined positions for the seating in the opposite disposed pairs thereof of the required number of ventilator plates or slats c. It is to be noted that the upper and lower of the ventilator plates or slats c, that the upper and lower edges thereof respectively, are abutted against the inner opposed faces of the upper and lower bars or members a, a', of the frame, and, if desired metal strips i may be secured on the latter in parallel relation to the adjacent edges of the plates or slats c. These metal strips i may be in the nature of the upper and lower bars or members of a frame, of which the vertical strips h constitute the side bars or members thereof, and when so formed and placed in position, will constitute a reinforcement to the vertical frame as well as an independent supporting frame for the ventilator plates or slats c.

It is also to be noted that the ventilator plates or slats c are made from either transparent, translucent, or opaque glass, whereby in the use of a clear transparent glass, an interior will be subjected to the full lighting effects of the day light hours and exposed to view from the outside after the manner or ordinary windows, while, in the use of a translucent or opaque glass, the interior will be subjected to the lighting effects of the day light hours, but not exposed to view from the outside, in which latter case, the necessity of making use of curtains or shades for rendering an interior private and otherwise free from outside observation is avoided. The glass plates or slats c may be made from other forms or types of glass, such as milk glass, frosted glass, ground glass, colored glass, wired glass or the like, with equal facility, and correspondingly for different conditions of use.

From the foregoing, it will be readily apparent that, while embodiments of the ventilators have been described and illustrated herein in specific terms and details of construction and arrangement, various changes in and modifications of the same may be resorted to without departing from the spirit of the invention, or the scope of the claims appended hereto.

Having thus fully described the invention what is claimed is:—

1. In a ventilator opposed spaced sets of fixed panel supports, the supports of each set arranged in spaced relation, each of said supports comprising an inclined rectangular supporting member, a flange integral with and of less length than one longitudinal edge of said member and further integral with one end edge and spaced from the other end edge of said member, a flange integral with the other longitudinal edge of and spaced from the flanged end of said member and further projecting beyond the other end edge of said member, said flanges disposed at right angles with respect to said member opposing each other and further one projecting beyond one end of the other, and means extending through the portion of that flange which projects beyond one end edge of said member for securing a panel supported by the opposed flanges against the flanged end of said member.

2. In a ventilator opposed spaced sets of fixed panels supports, the supports of each set arranged in spaced relation, each of said supports comprising an inclined rectangular supporting member, a flange integral with and less length than one longitudinal edge of said member and further integral with one end edge and spaced from the other end edge of said member, a flange integral with the other longitudinal edge of and spaced from the flanged end of said member and further projecting beyond the other end edge of said member, said flanges disposed at right-angles with respect to said member opposing each other and further one projecting beyond one end of the other, and removable means having threaded engagement with and extending through the portion of that flange which projects beyond one end edge of said member for securing a panel supported by the opposed flanges against the flanged end of said member.

In testimony whereof, I affix my signature hereto.

THOMAS A. JENKINS.